(12) United States Patent
Yoshida et al.

(10) Patent No.: US 12,415,564 B2
(45) Date of Patent: Sep. 16, 2025

(54) MOTOR CONTROL DEVICE AND ELECTRIC POWER STEERING DEVICE

(71) Applicant: NSK STEERING & CONTROL, INC., Tokyo (JP)

(72) Inventors: Keita Yoshida, Tokyo (JP); Hideki Sawada, Tokyo (JP)

(73) Assignee: NSK STEERING & CONTROL, INC., Tokyo (JP)

( * ) Notice: Subject to any disclaimer, the term of this patent is extended or adjusted under 35 U.S.C. 154(b) by 0 days.

(21) Appl. No.: 19/111,461

(22) PCT Filed: May 10, 2024

(86) PCT No.: PCT/JP2024/017489
§ 371 (c)(1),
(2) Date: Mar. 13, 2025

(87) PCT Pub. No.: WO2024/247667
PCT Pub. Date: Dec. 5, 2024

(65) Prior Publication Data
US 2025/0256766 A1    Aug. 14, 2025

(30) Foreign Application Priority Data
May 26, 2023    (JP) ................. 2023-087133

(51) Int. Cl.
*B62D 5/04*      (2006.01)
*H02P 21/00*    (2016.01)

(52) U.S. Cl.
CPC ......... *B62D 5/0463* (2013.01); *B62D 5/0481* (2013.01); *H02P 21/0089* (2013.01)

(58) Field of Classification Search
CPC .. B62D 5/0463; B62D 5/0481; H02P 21/0089
See application file for complete search history.

(56) References Cited

U.S. PATENT DOCUMENTS 3,573,577 A * 4/1971 Boyd ................ H02P 1/50
318/718
3,867,620 A * 2/1975 Coor ................ G06G 7/161
327/356

(Continued)

FOREIGN PATENT DOCUMENTS

CN    100369375 C * 2/2008
EP    1892174 A1 * 2/2008 ............ B62D 5/046

(Continued)

OTHER PUBLICATIONS

"A Vector Controlled Drive System for Electrically Power Assisted Steering Using Hall-Effect Sensors," Sorial et al., IEEE Access (vol. 9, 2021, pp. 116485-116499), Jan. 1, 2021. (Year: 2021).*

(Continued)

*Primary Examiner* — Khoi H Tran
*Assistant Examiner* — Jorge O Peche
(74) *Attorney, Agent, or Firm* — Sughrue Mion, PLLC

(57) ABSTRACT

The motor control device includes: a d-axis current command value calculation unit configured to set a first d-axis current command value for field-weakening; a first current limiting unit configured to calculate a first q-axis current command value by limiting a base q-axis current command value as to satisfy a condition of motor rated current; a second current limiting unit configured to calculate a second d-axis current command value and a second q-axis current command value by limiting the first d-axis current command value and the first q-axis current command value, respectively to satisfy and not exceed an allowable upper limit battery current; voltage command value calculation units configured to calculate voltage command values, based on the second d-axis current command value and the second q-axis current command value; and a voltage limiting unit (Continued)

configured to prevent saturation of a duty ratio by limiting the voltage command values.

11 Claims, 8 Drawing Sheets

(56) References Cited

U.S. PATENT DOCUMENTS

| | | | | |
|---|---|---|---|---|
| 4,520,300 A * | 5/1985 | Fradella | ............... | H02P 25/034 318/661 |
| 4,544,868 A * | 10/1985 | Murty | ............... | H02P 6/085 318/400.11 |
| 4,692,674 A * | 9/1987 | Packard | ............... | H02P 8/42 318/400.26 |
| 4,743,815 A * | 5/1988 | Gee | ............... | H02P 6/153 318/400.11 |
| 4,756,375 A * | 7/1988 | Ishikura | ............... | B62D 5/0478 180/404 |
| 4,809,173 A * | 2/1989 | Fukami | ............... | B62D 5/046 701/43 |
| 4,904,919 A * | 2/1990 | McNaughton | ............... | H02P 27/08 318/811 |
| 4,912,378 A * | 3/1990 | Vukosavic | ............... | H02P 6/182 318/400.34 |
| 4,922,169 A * | 5/1990 | Freeman | ............... | H02P 6/22 318/431 |
| 5,140,245 A * | 8/1992 | Stacey | ............... | G08C 19/42 318/723 |
| 5,182,499 A * | 1/1993 | Inaji | ............... | H02P 6/12 318/400.23 |
| 5,266,787 A * | 11/1993 | Mazz | ............... | H02P 5/46 318/68 |
| 5,298,847 A * | 3/1994 | Kerkman | ............... | H02P 21/18 318/800 |
| 5,394,321 A * | 2/1995 | McCleer | ............... | H02K 21/12 318/811 |
| 5,473,231 A * | 12/1995 | McLaughlin | ............... | B62D 6/10 318/432 |
| 5,475,289 A * | 12/1995 | McLaughlin | ............... | H02P 6/28 388/930 |
| 5,650,709 A * | 7/1997 | Rotunda | ............... | H02P 27/08 318/811 |
| 5,652,495 A * | 7/1997 | Narazaki | ............... | H02P 21/06 318/822 |
| 5,656,911 A * | 8/1997 | Nakayama | ............... | H02P 21/22 318/811 |
| 5,670,854 A * | 9/1997 | Matsuura | ............... | H02P 21/26 318/489 |
| 5,677,605 A * | 10/1997 | Cambier | ............... | H02P 6/181 318/400.14 |
| 5,701,066 A * | 12/1997 | Matsuura | ............... | H02P 21/141 318/8 |
| 5,737,223 A * | 4/1998 | Matsuoka | ............... | B62D 5/065 318/434 |
| 5,747,955 A * | 5/1998 | Rotunda | ............... | A63B 22/025 318/434 |
| 5,912,542 A * | 6/1999 | Zalesski | ............... | H02P 25/24 318/718 |
| 5,998,952 A * | 12/1999 | McLaughlin | ............... | H02P 25/098 318/432 |
| 6,008,599 A * | 12/1999 | Beck | ............... | B62D 5/0463 318/400.29 |
| 6,254,353 B1 * | 7/2001 | Polo | ............... | F04D 15/0281 73/152.01 |
| 6,329,781 B1 * | 12/2001 | Matsui | ............... | B60L 50/60 318/717 |
| 6,362,586 B1 * | 3/2002 | Naidu | ............... | H02P 21/06 318/432 |
| 6,389,342 B1 * | 5/2002 | Kanda | ............... | B62D 6/008 180/443 |
| 6,504,336 B2 * | 1/2003 | Sakamaki | ............... | B62D 5/0481 318/727 |
| 6,600,280 B2 * | 7/2003 | Kanda | ............... | B62D 5/0463 318/632 |
| 6,639,379 B2 * | 10/2003 | Matsushita | ............... | H02P 21/22 318/434 |
| 6,847,186 B1 * | 1/2005 | Kerlin | ............... | H02K 11/0094 318/751 |
| 7,339,346 B2 * | 3/2008 | Ta | ............... | H02P 25/03 318/807 |
| 7,463,006 B2 * | 12/2008 | Ta | ............... | H02P 27/08 318/807 |
| 7,887,064 B2 * | 2/2011 | Inoue | ............... | B60G 11/27 280/5.506 |
| 11,104,374 B2 * | 8/2021 | Miki | ............... | H02P 21/06 |
| 2002/0163319 A1 * | 11/2002 | Kaneko | ............... | H02P 21/04 903/903 |
| 2002/0171389 A1 * | 11/2002 | Nakazawa | ............... | H02P 21/18 318/811 |
| 2004/0090195 A1 * | 5/2004 | Motsenbocker | ............... | B60L 58/25 318/109 |
| 2004/0267421 A1 * | 12/2004 | Eskritt | ............... | B62D 5/065 701/41 |
| 2005/0017664 A1 * | 1/2005 | Takahashi | ............... | B62D 5/006 318/432 |
| 2005/0073279 A1 * | 4/2005 | Fenley | ............... | H02P 6/15 318/717 |
| 2005/0185434 A1 * | 8/2005 | Galbiati | ............... | H02M 7/53871 363/132 |
| 2005/0225275 A1 * | 10/2005 | Eskritt | ............... | H02M 7/53875 318/437 |
| 2006/0001392 A1 * | 1/2006 | Ajima | ............... | H02P 6/10 318/432 |
| 2006/0071628 A1 * | 4/2006 | Ta | ............... | H02P 27/08 318/807 |
| 2008/0018277 A1 * | 1/2008 | Ta | ............... | H02P 25/03 318/400.02 |
| 2008/0018278 A1 * | 1/2008 | Ta | ............... | H02P 25/03 318/400.17 |
| 2008/0047776 A1 * | 2/2008 | Kobayashi | ............... | B62D 5/046 701/41 |
| 2008/0067960 A1 * | 3/2008 | Maeda | ............... | B62D 5/046 180/443 |
| 2009/0234538 A1 | 9/2009 | Ta et al. | | |
| 2010/0032912 A1 * | 2/2010 | Inoue | ............... | F16F 15/002 280/5.502 |
| 2010/0156333 A1 * | 6/2010 | Chen | ............... | B60W 10/06 318/400.33 |
| 2012/0145472 A1 * | 6/2012 | Imamura | ............... | H02P 21/0003 180/446 |
| 2013/0043817 A1 * | 2/2013 | Shibuya | ............... | H02P 6/28 318/400.33 |
| 2013/0293988 A1 * | 11/2013 | Li | ............... | H02P 29/027 361/30 |
| 2015/0198934 A1 * | 7/2015 | Kaku | ............... | H02P 21/13 318/561 |
| 2015/0198935 A1 * | 7/2015 | Kaku | ............... | H02P 7/06 318/561 |
| 2017/0244344 A1 * | 8/2017 | Aghili | ............... | H02P 21/02 |
| 2021/0214000 A1 * | 7/2021 | Miki | ............... | H02P 21/06 |
| 2023/0406404 A1 | 12/2023 | Kato et al. | | |
| 2024/0291415 A1 * | 8/2024 | Korol | ............... | H02P 27/08 |

FOREIGN PATENT DOCUMENTS

| | | | | |
|---|---|---|---|---|
| EP | 2366603 A1 * | 9/2011 | ............ | B62D 5/0463 |
| EP | 4478604 A1 * | 12/2024 | ............ | H02P 25/22 |
| JP | H08142886 A * | 6/1996 | | |
| JP | 2010-064544 A | 3/2010 | | |
| JP | 2022-135662 A | 9/2022 | | |
| JP | 7588452 B1 * | 11/2024 | | |
| WO | WO-2006057317 A1 * | 6/2006 | ............ | B62D 5/046 |

(56) References Cited

FOREIGN PATENT DOCUMENTS

WO    2006/098516 A1    9/2006
WO    2020/095479 A1    5/2020

OTHER PUBLICATIONS

"Linear Dead-Time Compensation Control Using the Voltage Command Value Suitable for Low-Inductance Motors;" Hada et al., 2022 IEEE Energy Conversion Congress and Exposition (ECCE) (2022, pp. 1-7), Oct. 9, 2022. (Year: 2022).*
"Control Strategy to Improve Control Stability in Transient states of PMSM for xEV," Shin et al., 2024 IEEE Transportation Electrification Conference and Expo (ITEC) (2024, pp. 1-6), Jun. 19, 2024. (Year: 2024).*
"Adaptive PI Parameter of Flux-Weakening Controller Based on Voltage Feedback for Model Predictive Control of SPMSM," Zhang et a., 2020 IEEE Energy Conversion Congress and Exposition (ECCE) (2020, pp. 2674-2681), Dec. 11, 2020. (Year: 2020).*
International Search Report for PCT/JP2024/017489 dated Jul. 30, 2024.
Written Opinion for PCT/JP2024/017489 dated Jul. 30, 2024.

\* cited by examiner

MOTOR CONTROL DEVICE AND ELECTRIC POWER STEERING DEVICE

CROSS REFERENCE TO RELATED APPLICATIONS

This application is a National Stage of International Application No. PCT/JP2024/017489 filed May 10, 2024, claiming priority based on Japanese Patent Application No. 2023-087133 filed May 26, 2023.

TECHNICAL FIELD

The present invention relates to a motor control device and an electric power steering device.

BACKGROUND ART

In a motor control device that controls an electric motor, control output sometimes needs to be corrected. For example, in a motor control device that is mounted on an electric power steering, correction is performed on control output in accordance with system requirements or customer requirements. In PTL 1 described below, a motor control device that, while avoiding duty saturation in PWM control of a motor (that is, a state in which a voltage command value exceeds a maximum voltage applicable to a drive circuit), limits d-axis current to an arbitrary value is proposed.

CITATION LIST

Patent Literature

PTL 1: WO 2020/095479 A

SUMMARY OF INVENTION

Technical Problem

In the motor control device in PTL 1 described above, problems in that the duty ratio saturates in a high load condition, the duty ratio is reduced in a high rotational velocity region, and the like have arisen.

The present invention has been made in consideration of the above-described circumstances, and an object of the present invention is to prevent saturation of a duty ratio in a high load condition and reduction in the duty ratio in a high rotational velocity region in association with correction of control output of a motor control device.

Solution to Problem

In order to achieve the above-described object, according to an aspect of the present invention, there is provided a motor control device including: a torque control unit configured to set a base q-axis current command value to control torque generated by a motor; a d-axis current command value calculation unit configured to set a first d-axis current command value for field-weakening, based on the base q-axis current command value and rotational velocity of the motor; a first current limiting unit disposed in a succeeding stage of the d-axis current command value calculation unit and configured to calculate a first q-axis current command value by limiting the base q-axis current command value according to the first d-axis current command value in such a way that driving current of the motor does not exceed a rated current of the motor; a second current limiting unit disposed in a succeeding stage of the first current limiting unit and configured to calculate a second d-axis current command value and a second q-axis current command value by limiting the first d-axis current command value and the first q-axis current command value, respectively in such a way that output current from a battery does not exceed a predetermined allowable upper limit; a voltage command value calculation unit configured to calculate a first d-axis voltage command value and a first q-axis voltage command value, based on the second d-axis current command value and the second q-axis current command value; a voltage limiting unit configured to calculate a second d-axis voltage command value and a second q-axis voltage command value by limiting the first d-axis voltage command value and the first q-axis voltage command value, respectively in such a way as to prevent saturation of a duty ratio in PWM control based on the first d-axis voltage command value and the first q-axis voltage command value; and a drive circuit configured to drive the motor, based on the second d-axis voltage command value and the second q-axis voltage command value.

According to another aspect of the present invention, there is provided an electric power steering device including: the motor control device described above; and a motor controlled by the motor control device, wherein the electric power steering device provides a steering system of a vehicle with a steering assist force, using the motor.

Advantageous Effects of Invention

According to the present invention, it is possible to prevent saturation of a duty ratio in a high load condition and reduction in the duty ratio in a high rotational velocity region in association with correction of control output of a motor control device.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
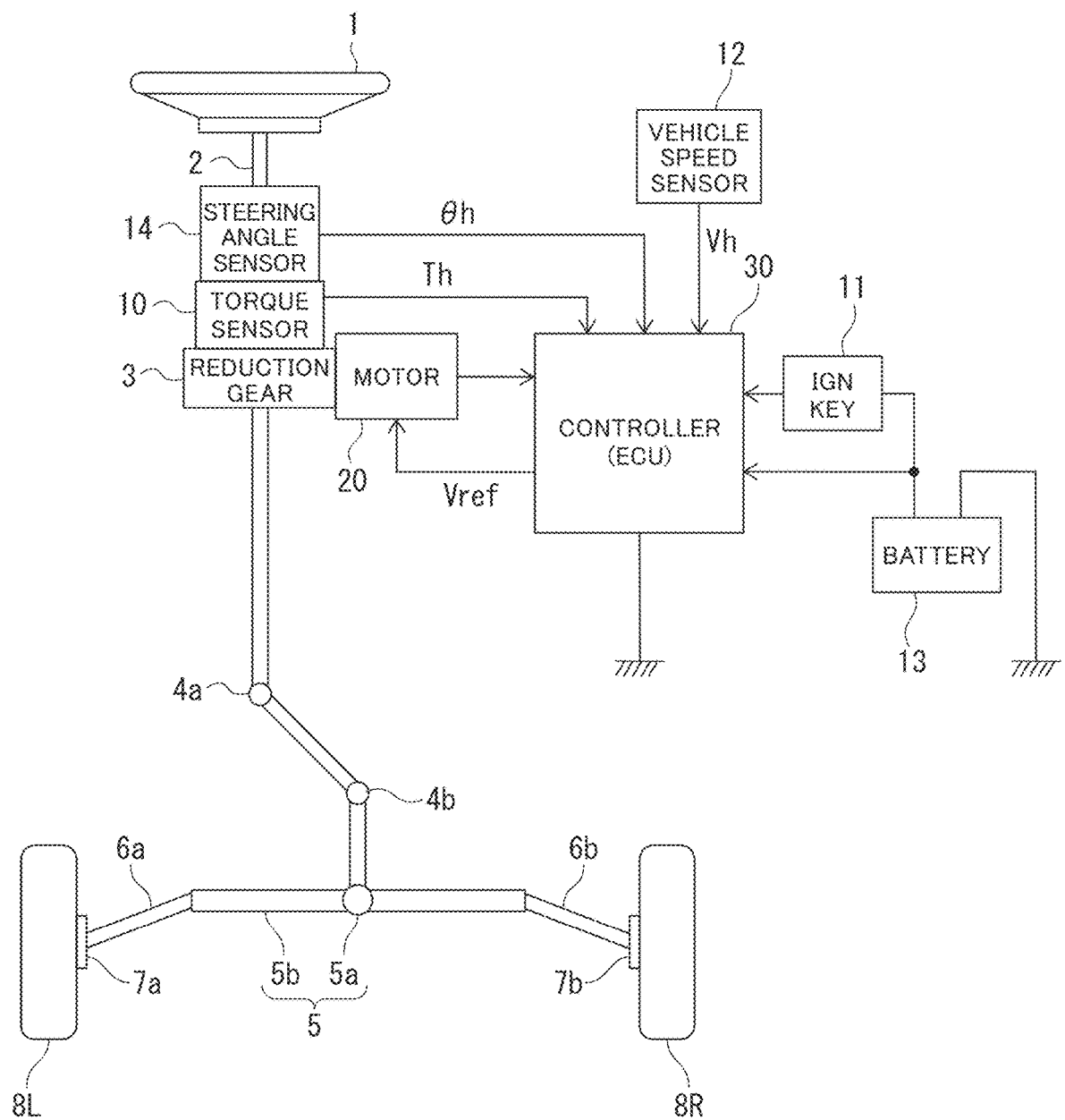
FIG. 1 is a configuration diagram illustrative of an outline of an example of an electric power steering device of an embodiment.

FIG. 1 is a configuration diagram illustrative of an outline of an example of an electric power steering device of an embodiment. A steering shaft (steering wheel shaft) 2 of a steering wheel 1 is connected to steered wheels 8L and 8R by way of a reduction gear (worm gear) 3 that constitutes a speed reduction mechanism, universal joints 4a and 4b, a pinion rack mechanism 5, and tie rods 6a and 6b and further via hub units 7a and 7b.

The pinion rack mechanism 5 includes a pinion 5a that is coupled to a pinion shaft to which steering force is transmitted from the universal joint 4b and a rack 5b that meshes with the pinion 5a, and converts rotational motion transmitted to the pinion 5a to linear motion in the vehicle width direction by means of the rack 5b.

To the steering shaft 2, a torque sensor 10 configured to detect steering torque Th is disposed. To the steering shaft 2, a steering angle sensor 14 configured to detect a steering angle θh of the steering wheel 1 is also disposed.

A motor 20 configured to assist steering force of the steering wheel 1 is also connected to the steering shaft 2 via the reduction gear 3. To a controller 30 configured to control the electric power steering device (EPS), power is supplied from a battery 13 and an ignition key signal is also input by way of an ignition (IGN) key 11.

The motor 20 is a polyphase AC motor and is driven by vector control performed by the controller 30. In the present embodiment, a case where the motor 20 is a three-phase AC motor is described as an example.

The controller 30 is an electronic control unit (ECU) configured to perform calculation of a current command value of an assist control command, based on steering torque Th detected by the torque sensor 10, vehicle speed Vh detected by a vehicle speed sensor 12, and a steering angle θh detected by the steering angle sensor 14 and control current to be supplied to the motor 20 in accordance with a voltage command value Vref obtained by performing compensation and the like on the calculated current command value.

Note that the steering angle sensor 14 is not an essential component and the steering angle θh may be calculated by adding a torsion angle of a torsion bar in the torque sensor 10 to a rotation angle acquired from a rotation angle sensor configured to detect a rotation angle of the rotation shaft of the motor 20.

In addition, a turning angle of the steered wheels 8L and 8R may be used in place of the steering angle θh. The turning angle may be detected by, for example, detecting a displacement amount of the rack 5b.

The controller 30 includes, for example, a computer including a processor and peripheral components, such as a storage device. The processor may be, for example, a central processing unit (CPU) or a micro-processing unit (MPU).

The storage device may include one of a semiconductor storage device, a magnetic storage device, and an optical storage device. The storage device may include registers, a cache memory, or a memory, such as a read only memory (ROM) and a random access memory (RAM), that is used as a main storage device.

Functions of the controller 30, which will be described below, are achieved by, for example, the processor of the controller 30 executing computer programs stored in the storage device.

Note that the controller 30 may be formed by use of dedicated hardware for executing each type of information processing that will be described below.

For example, the controller 30 may include functional logic circuits that are set in a general-purpose semiconductor integrated circuit. For example, the controller 30 may have a programmable logic device (PLD), such as a field-programmable gate array (FPGA), or the like.

Next, problems in a limiting function of control output to the motor 20 performed by the controller 30 will be described. The limiting function of the control output to the motor 20 has been developed with the aims of (1) calculating the amount of field-weakening current to satisfy a requirement for following performance of a turning angle of the steered wheels with respect to steering of the steering wheel, (2) satisfying a system current upper limit and a battery current upper limit, and (3) preventing duty saturation.

However, in the motor control device in PTL 1 described above, the following problems 1 and 2 remain to be solved.

(Problem 1) There are some cases where the duty saturation cannot be prevented in a high load condition.

(Problem 2) There are some cases where a reduction in a duty ratio occurs in a high rotational velocity region.

Therefore, the motor control device in the embodiment aims at solving the problems 1 and 2.

Further, the motor control device in the embodiment also aims at solving, in addition to the problems 1 and 2, the following problems 3 and 4.

(Problem 3) Since as described later, an integrator is used in feedback control of motor current in the motor control device in the embodiment, there is a risk that integrated values are excessively accumulated.

(Problem 4) Due to a recent requirement for high output power, use of a motor having low inductance and inertia is widely accepted. Therefore, a counter measure against overcurrent caused by counter electromotive voltage at the time of high speed rotation needs to be taken.

In the present invention, means for solving the above-described problems 1 to 4 is provided based on the following principle.

It is considered that the duty saturation in a high load condition (problem 1) is caused by steady-state deviation or error due to transient characteristics in the feedback control of the motor current, an inappropriate position at which current limiting is performed, an attempt to apply limitation of a duty dimension in a current dimension, or the like. Thus, prevention of duty saturation is achieved by limiting a voltage command value.

It is considered that the reduction in the duty ratio in the high rotational velocity region (problem 2) is caused by excessively limiting a q-axis current command value. Thus, a limiting method of the q-axis current command value is reconsidered and the q-axis current command value is limited in a preferential manner.

Against the excessive accumulation of integrated values in the feedback control of motor current (problem 3), an anti-windup function is newly added.

As a counter measure against an overcurrent (problem 4), counter electromotive voltage is reduced by field-weakening by flowing as large a d-axis current command value as possible at the time of high speed rotation. To flow as large a d-axis current command value as possible, the q-axis current command value is limited in a preferential manner.

Figure 2:
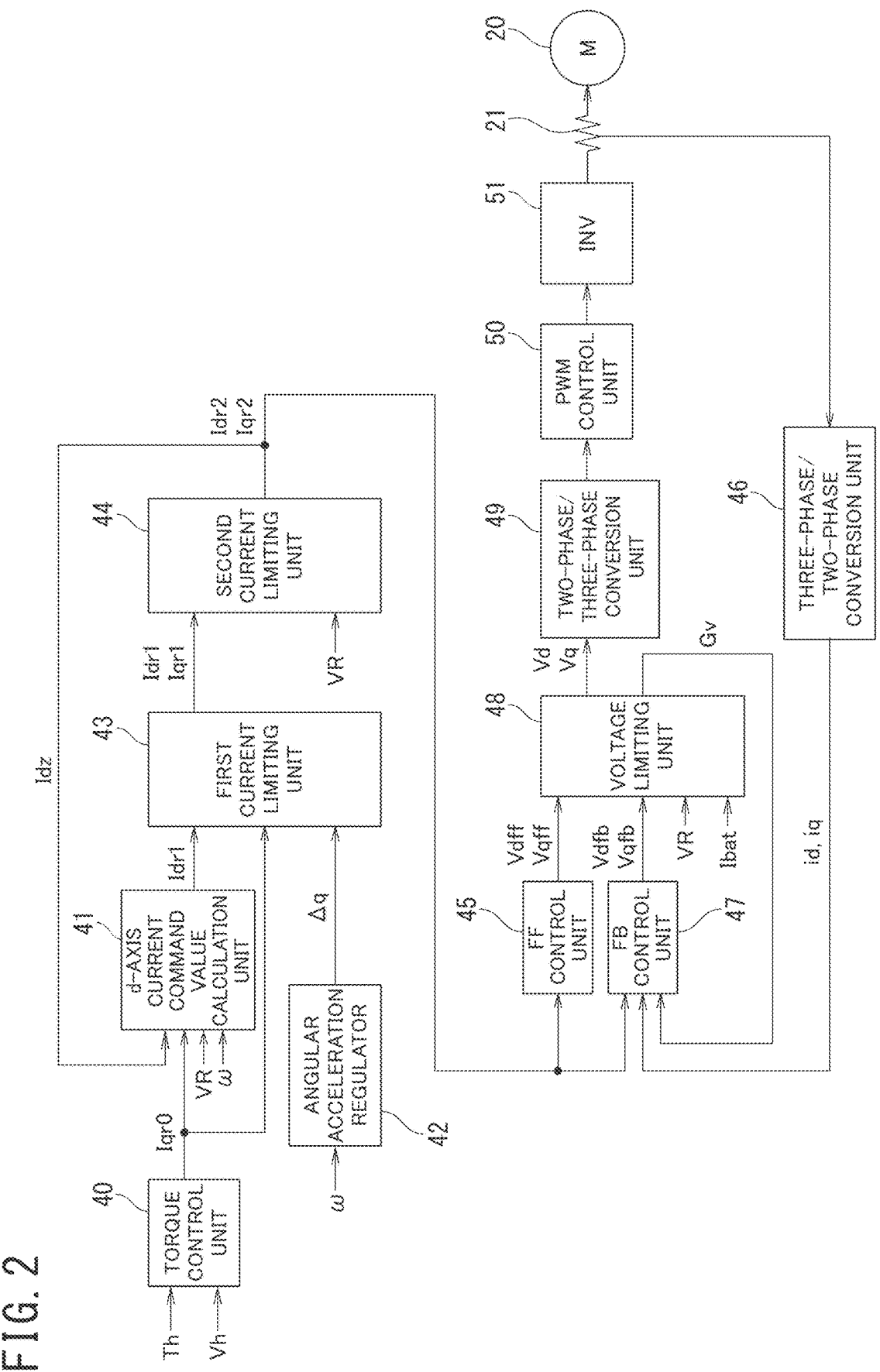
FIG. 2 is a block diagram illustrative of an example of a functional configuration of a controller illustrated in FIG. 1.

To achieve the above-described counter measures, the inventors of the present invention performed reconstruction and arrangement change of functional constituent elements of the controller 30. FIG. 2 is a block diagram illustrative of an example of a functional configuration of the controller 30. The controller 30 includes a torque control unit 40, a d-axis current command value calculation unit 41, an angular acceleration regulator 42, a first current limiting unit 43, a second current limiting unit 44, a feedforward (FF) control unit 45, a three-phase/two-phase conversion unit 46, a feedback (FB) control unit 47, a voltage limiting unit 48, a two-phase/three-phase conversion unit 49, a pulse width modulation (PWM) control unit 50, and an inverter (INV) 51.

The torque control unit 40 calculates a base q-axis current command value Iqr0 that is a current command value to control torque generated by the motor 20, based on at least the steering torque Th and the vehicle speed Vh.

The d-axis current command value calculation unit 41 sets a first d-axis current command value Idr1 for field-weakening, based on the base q-axis current command value Iqr0, rotational velocity ω of the motor 20, power source voltage VR supplied by the battery 13.

Figure 3:
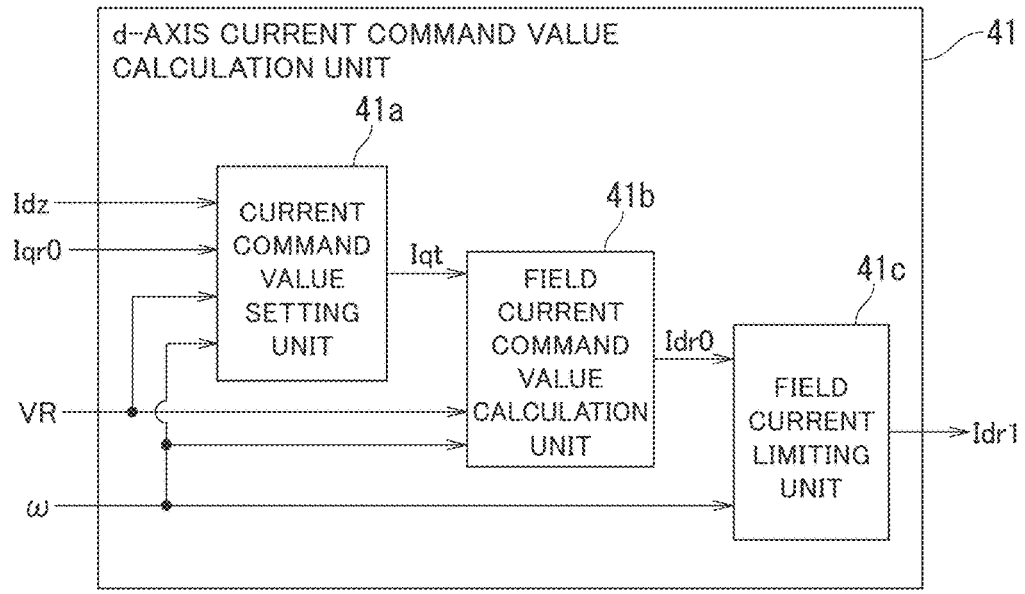
FIG. 3 is a block diagram illustrative of an example of a functional configuration of a d-axis current command value calculation unit.

FIG. 3 is a block diagram illustrative of an example of a functional configuration of the d-axis current command value calculation unit 41. The d-axis current command value calculation unit 41 includes a current command value setting unit 41a, a field current command value calculation unit 41b, and a field current limiting unit 41c.

The current command value setting unit 41a sets a q-axis current command value Iqt used for calculation of a base d-axis current command value Idr0 in the field current command value calculation unit 41b in the succeeding stage, based on the base q-axis current command value Iqr0, the rotational velocity ω, the power source voltage VR, and a past value Idz of the d-axis current command value.

Herein, the current command value setting unit 41a sets a q-axis current command value Iqt that is appropriate for the base d-axis current command value Idr0 to satisfy a condition of rated current of the motor 20 and a condition of allowable upper limit current of the battery 13.

Note that as the past value Idz of the d-axis current command value, a past value of a second d-axis current command value Idr2 that the second current limiting unit 44 calculates as described later (for example, a second d-axis current command value Idr2 that the second current limiting unit 44 calculated in the last control period) may be used.

In the following description, the condition of the rated current of the motor 20 and the condition of the allowable upper limit current of the battery 13 are sometimes referred to as "system current limitation" and "battery current limitation", respectively.

Regarding the system current limitation, the current command value setting unit 41a sets a limiting gain Gq1 for the q-axis current command value in accordance with the equation (1) below in such a way that the d-axis current command value and the q-axis current command value are less than or equal to a system maximum current Imax (for example, the rated current of the motor).

Note that processing to prevent division by "0" is performed in a calculation process of the equation (1). In addition, limiter processing (limited to within 0 to 1) is performed least a calculation result exceed 1.

[Math 1]

$$Gq1 = \frac{\sqrt{(Imax)^2 - (Idz)^2}}{Iqr0} \quad (1)$$

Regarding the battery current limitation, the current command value setting unit 41a sets a limiting gain Gq2 for the q-axis current command value in such a way that battery current Ibat output from the battery 13 becomes less than or equal to a predetermined allowable upper limit Ibatmax. The current command value setting unit 41a sets a limiting gain Gd1 for the d-axis current command value in accordance with the equation (2) below in such a way that the battery current Ibat does not exceed the allowable upper limit Ibatmax due to only the d-axis current command value. Note that in the equation (2), the processing to prevent division by "0" and the limiter processing are also performed.

[Math 2]

$$Gd1 = \frac{\sqrt{6R(VR \cdot Ibatmax - Ploss)}}{3 \cdot R \cdot Idz} \quad (2)$$

Note that the constant R denotes a resistance value of windings for respective phases of the motor 20 and Ploss denotes iron loss, loss due to friction, or the like. The current command value setting unit 41a sets the limiting gain Gq2 for the q-axis current command value in accordance with the equation (3) below, based on the limiting gain Gd1 set in accordance with the equation (2). Note that the constant Kt denotes a torque constant of the motor 20. Note that in the equation (3), the processing to prevent division by "0" and the limiter processing are also performed.

[Math 3]

$$Gq2 = \frac{-K_t \omega + \sqrt{(K_t \omega)^2 - (3 \cdot R \cdot Gd1 \cdot Idz)^2 + 6R(VR \cdot Ibatmax - Ploss)}}{3R \cdot Iqr0} \quad (3)$$

The current command value setting unit 41a calculates the q-axis current command value Iqt=min(Gq1, Gq2)×Iqr0 by multiplying the base q-axis current command value Iqr0 by a smaller one of the limiting gains Gq1 and Gq2.

The field current command value calculation unit 41b calculates the base d-axis current command value Idr0 that is a field current command value for field-weakening, based on the q-axis current command value Iqt set by the current command value setting unit 41a, the rotational velocity ω, and the power source voltage VR in accordance with the equation (4) below. Note that a constant L denotes inductance per phase of the motor and a constant ψ denotes the number of flux linkages that is determined depending on the motor.

[Math 4]

$$Idr0 = -\frac{\omega^2 \Psi L}{R^2 + \omega^2 L^2} + \sqrt{\frac{VR^2/3}{R^2 + \omega^2 L^2} - \left\{Iqt + \frac{R\omega\Psi}{R^2 + \omega^2 L^2}\right\}^2} \quad (4)$$

The field current limiting unit 41c calculates the first d-axis current command value Idr1 by limiting the base d-axis current command value Idr0 to only a direction of the field-weakening current.

Although a limit value of the d-axis current command value is determined in consideration of balance between a requirement for the following performance of the turning angle with respect to steering of the steering wheel and operation noise, it is required to flow as large a d-axis current command value as possible to solve the above-described problem 4 (a counter measure against overcurrent) in the present embodiment.

Therefore, the field current limiting unit 41c calculates the first d-axis current command value Idr1 by limiting the base d-axis current command value Idr0 to a value less than or equal to a d-axis current upper limit IdUL and changes the d-axis current upper limit IdUL according to the rotational velocity ω.

Figure 4A:
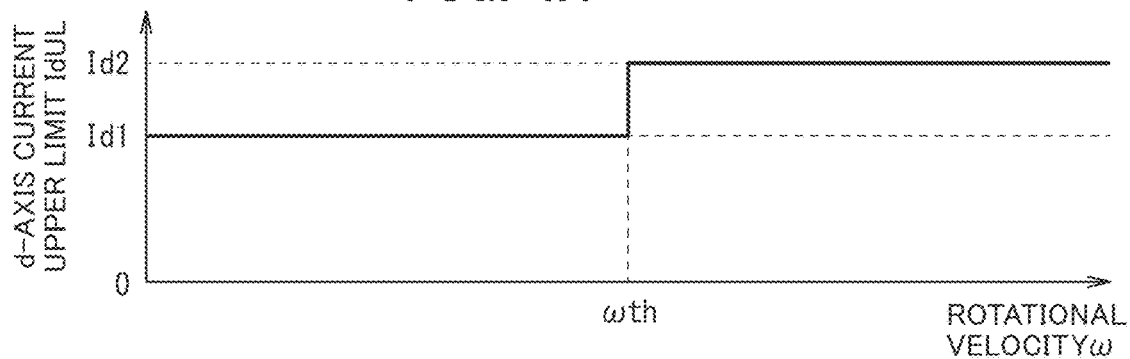
FIG. 4A is a diagram illustrative of a setting example of an example of a d-axis current upper limit that is set by a field current limiting unit.

FIG. 4A is a diagram illustrative of a setting example of an example of the d-axis current upper limit IdUL that is set by the field current limiting unit 41c. In a range where the rotational velocity ω is less than a threshold value ωth, the d-axis current upper limit IdUL is set to a first limit value Id1 that is comparatively small, and in a range where the rotational velocity ω is greater than or equal to the threshold value ωth, the d-axis current upper limit IdUL is set to a second limit value Id2 that is larger than the first limit value Id1.

For example, the threshold value ωth may be set by converting a maximum steering angular velocity that is conceivable to be potentially generated at the time of emergency avoidance or the like to a rotational velocity of the motor 20. Because of this configuration, quietness of operation noise at the time of regular steering and the following performance of the turning angle with respect to steering of the steering wheel at the time of emergency avoidance or the like can be balanced with each other.

The field current limiting unit 41c may include a rate limiter configured to limit temporal change in the first d-axis current command value Idr1.

Figure 4B:
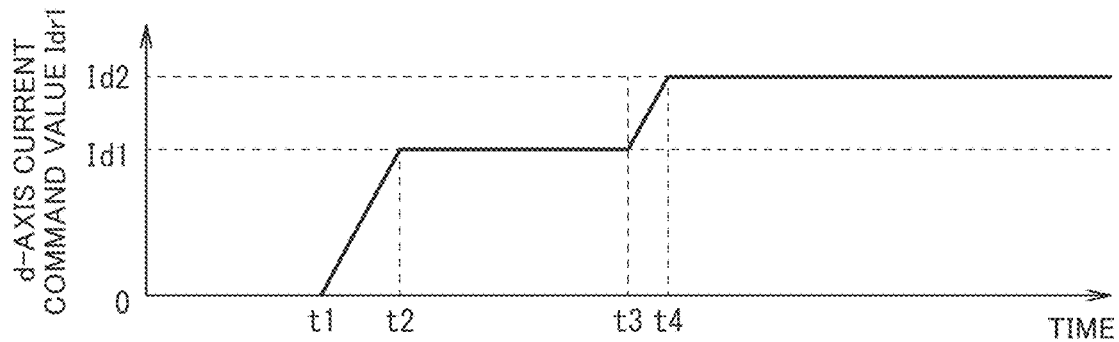
FIG. 4B is a timing diagram of an example of limitation of a d-axis current command value.

FIG. 4B is a timing diagram of an example of the limitation of the first d-axis current command value Idr1. When the base d-axis current command value Idr0 is input at time t1, the first d-axis current command value Idr1 gradually increases with an increase rate limited by the rate limiter and reaches the first limit value Id1 at time t2.

Subsequently, when the rotational velocity ω of the motor 20 increases and exceeds the threshold value ωth at time t3, the d-axis current upper limit IdUL increases to the second limit value Id2. As a result, the first d-axis current command value Idr1 gradually increases with the increase rate limited by the rate limiter and reaches the second limit value Id2 at time t4.

FIG. 2 is now referred to. The angular acceleration regulator 42 sets a compensation value Δq of the q-axis current command value to suppress torque variation, based on the rotational velocity ω of the motor 20.

The first current limiting unit 43 calculates a first q-axis current command value Iqr1 by compensating the base q-axis current command value Iqr0 with the compensation value Δq and limiting a base q-axis current command value after compensation (Iqr0+Δq) in such a way that driving current of the motor 20 does not exceed the system current limit.

Specifically, the first current limiting unit 43 sets a limiting gain Gq3 in accordance with the equation (5) below. Note that in the equation (5), the processing to prevent division by "0" and the limiter processing are also performed.

[Math 5]

$$Gq3 = \frac{\sqrt{(Imax)^2 - (Idr1)^2}}{Iqr0 + \Delta q} \quad (5)$$

The first current limiting unit 43 calculates the first q-axis current command value Iqr1=Gq3×(Iqr0+Δq) by multiplying the base q-axis current command value (Iqr0+Δq) by the limiting gain Gq3.

The second current limiting unit 44 calculates the second d-axis current command value Idr2 and a second q-axis current command value Iqr2 by limiting the first d-axis current command value Idr1 and the first q-axis current command value Iqr1, respectively in such a way that the battery current Ibat does not exceed the battery current limit.

Specifically, the second current limiting unit 44 sets a limiting gain Gd2 for the d-axis current command value and a limiting gain Gq4 for the q-axis current command value in accordance with the equations (6) and (7) below, respectively. Note that in the equations (6) and (7), the processing to prevent division by "0" and the limiter processing are also performed.

[Math 6]

$$Gd2 = \frac{\sqrt{6R(VR \cdot Ibatmax - Ploss)}}{3 \cdot R \cdot Idr1} \quad (6)$$

$$Gq4 = \frac{-K_t\omega + \sqrt{(K_t\omega)^2 - (3 \cdot R \cdot Gd2 \cdot Idr1)^2 + 6R(VR \cdot Ibatmax - Ploss)}}{3R \cdot Iqr1} \quad (7)$$

The second current limiting unit 44 calculates the second d-axis current command value Idr2=Gd2×Idr1 by multiplying the first d-axis current command value Idr1 by the limiting gain Gd2 and calculates the second q-axis current command value Iqr2=Gq4×Iqr1 by multiplying the first q-axis current command value Iqr1 by the limiting gain Gq4.

The FF control unit 45 calculates a FF d-axis voltage command value Vdff and a FF q-axis voltage command value Vqff that are voltage command values to the motor 20, by feedforward control based on the second d-axis current command value Idr2 and the second q-axis current command value Iqr2, respectively.

For example, the FF control unit 45 may calculate, as the FF d-axis voltage command value Vdff and the FF q-axis voltage command value Vqff, dq-axis non-interference voltage command values that cancel interference voltages interfering with each other between the d-axis and the q-axis.

In addition, for example, the FF control unit 45 may calculate feedforward outputs from a two-degree-of-freedom control configuration as the FF d-axis voltage command value Vdff and the FF q-axis voltage command value Vqff.

The FF d-axis voltage command value Vdff and the FF q-axis voltage command value Vqff are examples of a "first d-axis voltage command value" and a "first q-axis voltage command value" described in the claims, respectively.

The three-phase/two-phase conversion unit 46 converts detected values of three-phase currents of the motor 20 that are detected by a motor current detector 21 to d-axis current id and q-axis current iq.

The FB control unit 47 calculates a FB d-axis voltage command value Vdfb that is a d-axis voltage command value to the motor 20, by feedback control based on current deviation ΔId of a detected value id of the d-axis current in the driving current of the motor 20 with respect to the second d-axis current command value Idr2.

In addition, the FB control unit 47 calculates a FB q-axis voltage command value Vqfb that is a q-axis voltage command value to the motor 20, by feedback control based on current deviation ΔIq of a detected value iq of the q-axis current in the driving current of the motor 20 with respect to the second q-axis current command value Iqr2.

The FB d-axis voltage command value Vdfb and the FB q-axis voltage command value Vqfb are examples of the "first d-axis voltage command value" and the "first q-axis voltage command value" described in the claims, respectively.

The FB control unit 47 calculates the FB d-axis voltage command value Vdfb and the FB q-axis voltage command value Vqfb by at least one of proportional control (P-control), integral control (I-control), and derivative control (D-control) based on the current deviations ΔId and ΔIq or a combination of the foregoing.

Figure 5:
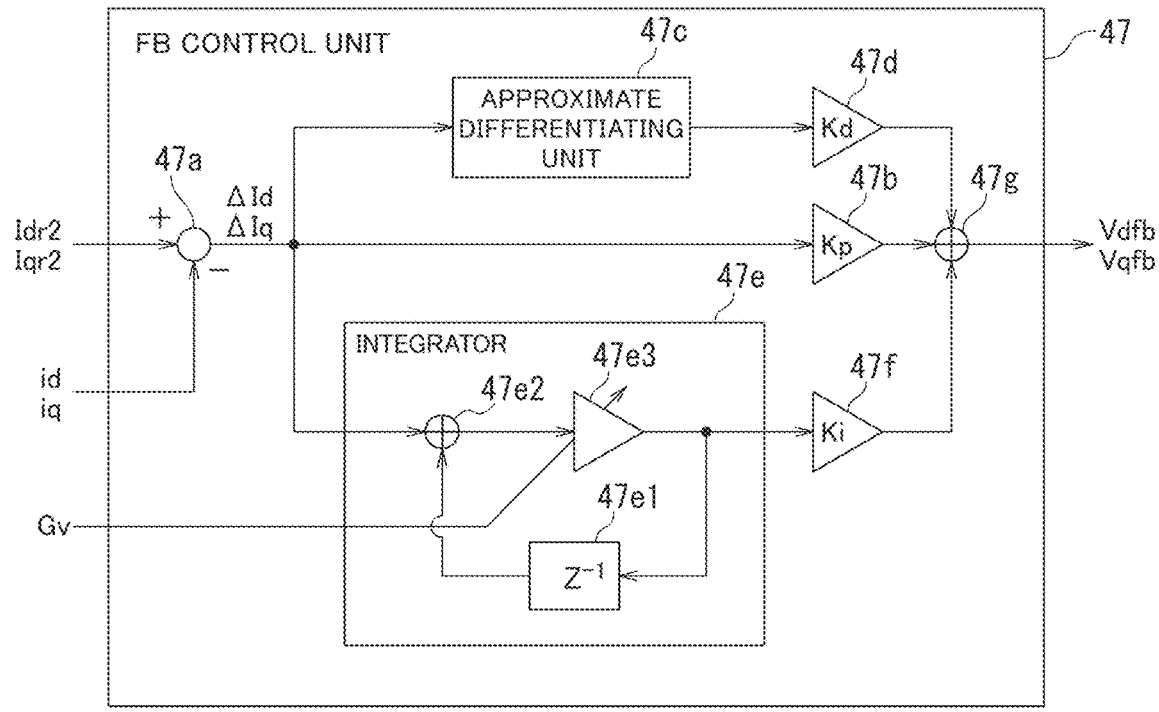
FIG. 5 is a block diagram illustrative of an example of a functional configuration of a feedback (FB) control unit.

FIG. 5 is a block diagram illustrative of an example of a functional configuration of the FB control unit 47 when the FB d-axis voltage command value Vdfb and the FB q-axis voltage command value Vqfb are calculated by proportional-integral-derivative (PID) control.

The FB control unit 47 includes a subtracter 47a, gain multiplication units 47b, 47d, and 47f, an approximate differentiating unit 47c, an integrator 47e, and an adder 47g.

The subtracter 47a calculates current deviation ΔId=(Idr2−id) of the detected value id of the d-axis current with respect to the second d-axis current command value Idr2 and current deviation ΔIq=(Iqr2−iq) of a detected value iq of the q-axis current with respect to the second q-axis current command value Iqr2.

The gain multiplication unit 47b outputs a multiplication result of the current deviation ΔId and a proportional gain Kp and a multiplication result of the current deviation ΔIq and the proportional gain Kp to the adder 47g.

The approximate differentiating unit 47c calculates differential values of the current deviations ΔId and ΔIq. For example, the approximate differentiating unit 47c may calculate the differential values by multiplying the current deviations ΔId and ΔIq by a transfer function s/(Ts+1) that is obtained by combining a differential operation and a low-pass filter. The gain multiplication unit 47d outputs a multiplication result of the differential value of the current deviation ΔId and a differential gain Kd and a multiplication result of the differential value of the current deviation ΔIq and the differential gain Kd to the adder 47g.

The integrator 47e calculates integrated values of the current deviations ΔId and ΔIq. The gain multiplication unit 47f outputs a multiplication result of the integrated value of the current deviation ΔId and an integral gain Ki and a multiplication result of the integrated value of the current deviation ΔIq and the integral gain Ki to the adder 47g.

The adder 47g outputs a sum of the multiplication result of the current deviation ΔId and the proportional gain Kp, the multiplication result of the differential value of the current deviation ΔId and the differential gain Kd, and the multiplication result of the integrated value of the current deviation ΔId and the integral gain Ki, as the FB d-axis voltage command value Vdfb.

In addition, the adder 47g outputs a sum of the multiplication result of the current deviation ΔIq and the proportional gain Kp, the multiplication result of the differential value of the current deviation ΔIq and the differential gain Kd, and the multiplication result of the integrated value of the current deviation ΔIq and the integral gain Ki, as the FB q-axis voltage command value Vqfb.

The integrator 47e includes a delay element 47e1, an adder 47e2, and a gain multiplication unit 47e3. The delay element 47e1 delays an integral component of the current deviation ΔId and an integral component of the current deviation ΔIq, the integral components being output from the integrator 47e, and subsequently inputs the delayed integral components to the adder 47e2. That is, the delay element 47e1 inputs past values (last values) of the outputs from the integrator 47e to the adder 47e2.

The adder 47e2 outputs a sum of the current deviation ΔId and an output from the delay element 47e1 and a sum of the current deviation ΔIq and the other output from the delay element 47e1. Specifically, the adder 47e2 outputs a sum obtained by adding the current deviation ΔId to a past value of the integral component of the current deviation ΔId. In addition, the adder 47e2 outputs a sum obtained by adding the current deviation ΔIq to a past value of the integral component of the current deviation ΔIq.

The gain multiplication unit 47e3 calculates multiplication results obtained by multiplying respective outputs from the adder 47e2 by a voltage limiting gain Gv that the voltage limiting unit 48 sets and that will be described later, as outputs of the integrator 47e (that is, integral components of the current deviations ΔId and ΔIq) and outputs the multiplication results to the gain multiplication unit 47f and also inputs the multiplication results to the delay element 47e1.

Since multiplying the outputs from the adder 47e2 by the voltage limiting gain Gv enables integrated values in the integrator 47e to be reduced, the anti-windup function of integrated values can be achieved.

For example, as described later, setting the voltage limiting gain Gv to a value less than a value "1" enables accumulation of integrated values by the integrator 47e to be suppressed. In addition, for example, setting the voltage limiting gain Gv to a value "0" enables integrated values by the integrator 47e to be reset to "0".

FIG. 2 is now referred to. The voltage limiting unit 48 calculates a second d-axis voltage command value Vd and a second q-axis voltage command value Vq by limiting the FF d-axis voltage command value Vdff, the FB d-axis voltage command value Vdfb, the FF q-axis voltage command value Vqff, and the FB q-axis voltage command value Vqfb in such a way as to prevent the duty ratio from saturating in the PWM control based on the voltage command values Vdff, Vdfb, Vqff, and Vqfb.

Figure 6:
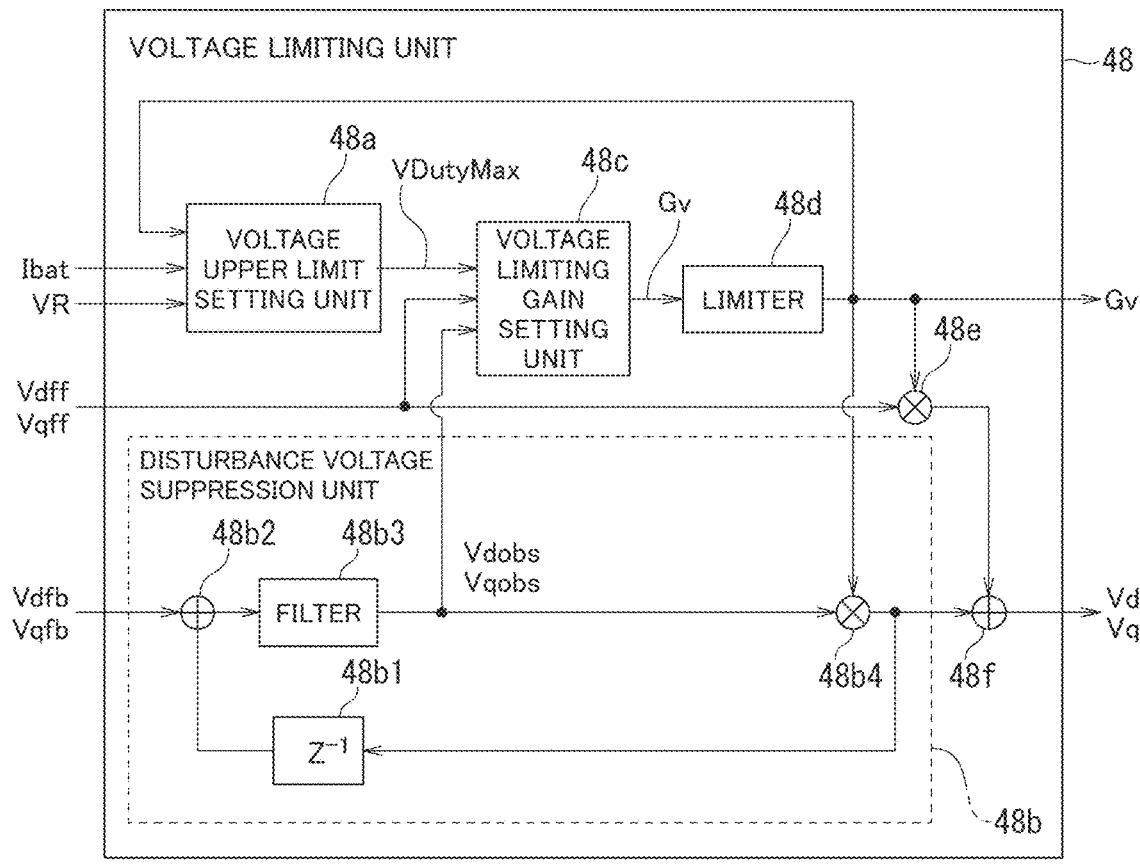
FIG. 6 is a block diagram illustrative of an example of a functional configuration of a voltage limiting unit.

FIG. 6 is a block diagram illustrative of an example of a functional configuration of the voltage limiting unit 48. The voltage limiting unit 48 includes a voltage upper limit setting unit 48a, a disturbance voltage suppression unit 48b, a voltage limiting gain setting unit 48c, a limiter 48d, a multiplier 48e, and an adder 48f.

The voltage upper limit setting unit 48a sets a voltage upper limit VDutyMax that is an upper limit of a voltage command value that prevents duty saturation from occurring. Since directions in which dead time of the inverter 51 acts on the upper limit are different between at the time of power running of the motor 20 and at the time of regeneration of the motor 20, the voltage upper limit setting unit 48*a* sets a voltage upper limit VDutyMax at the time of power running in accordance with the equation (8) below and sets a voltage upper limit VDutyMax at the time of regeneration in accordance with the equation (9) below.

[Math 7]

$$VDutyMax = \frac{VR}{\sqrt{3}} \cdot \frac{\left(DutyMaxRate - \frac{2 \cdot DeadTime}{PWMTime}\right)}{VRDutyConvFactor} \quad (8)$$

$$VDutyMax = \frac{VR}{\sqrt{3}} \cdot \frac{\left(DutyMaxRate + \frac{2 \cdot DeadTime}{PWMTime}\right)}{VRDutyConvFactor} \quad (9)$$

Since superimposing a third-order harmonic on a three-phase voltage command values of the motor 20 causes voltage use efficiency to be improved, the upper limit of the voltage command value can be increased to $2/\sqrt{3}$ times of the power source voltage VR. A range of 0 to 100% of the duty ratio in the PWM control corresponds to a range from a lower limit of negative-side voltage to an upper limit of positive-side voltage of applied voltage. Thus, in the above-described equations (8) and (9), the power source voltage VR is multiplied by a coefficient of $1/\sqrt{3}$ that is equivalent to the upper limit of one side of the positive side and the negative side.

In addition, a voltage command value equivalent to a reduction (2×DeadTime/PWMTime) due to dead time DeadTime of the inverter 51 is subtracted or added depending on whether the motor 20 is in a power running state or a regeneration state. Note that PWMTime denotes a PWM period of the PWM control unit 50. Since an actual value of the dead time DeadTime often deviates from a design value, a dead time compensation value that is appropriately set may be subtracted or added depending on whether the motor 20 is in the power running state or the regeneration state.

In addition, a rate (gradient) of change in terminal voltage of the motor 20 with respect to change in the duty ratio is reduced due to the dead time compensation. To compensate for the reduction, computation formulae in the above-described equations (8) and (9) are multiplied by an inverse of a conversion factor VRDutyConvFactor. Since the conversion factor VRDutyConvFactor acts in a direction in which the voltage command value is reduced in converting to a duty ratio, a voltage command value equivalent to the reduction is compensated for by increasing the voltage upper limit VDutyMax.

In addition, a constant DutyMaxRate is set by subtracting quantization error due to calculation in a later stage and a margin for securing current detection precision from a value "1" (that is, DutyMaxRate=100%−quantization error−margin).

Figure 7:
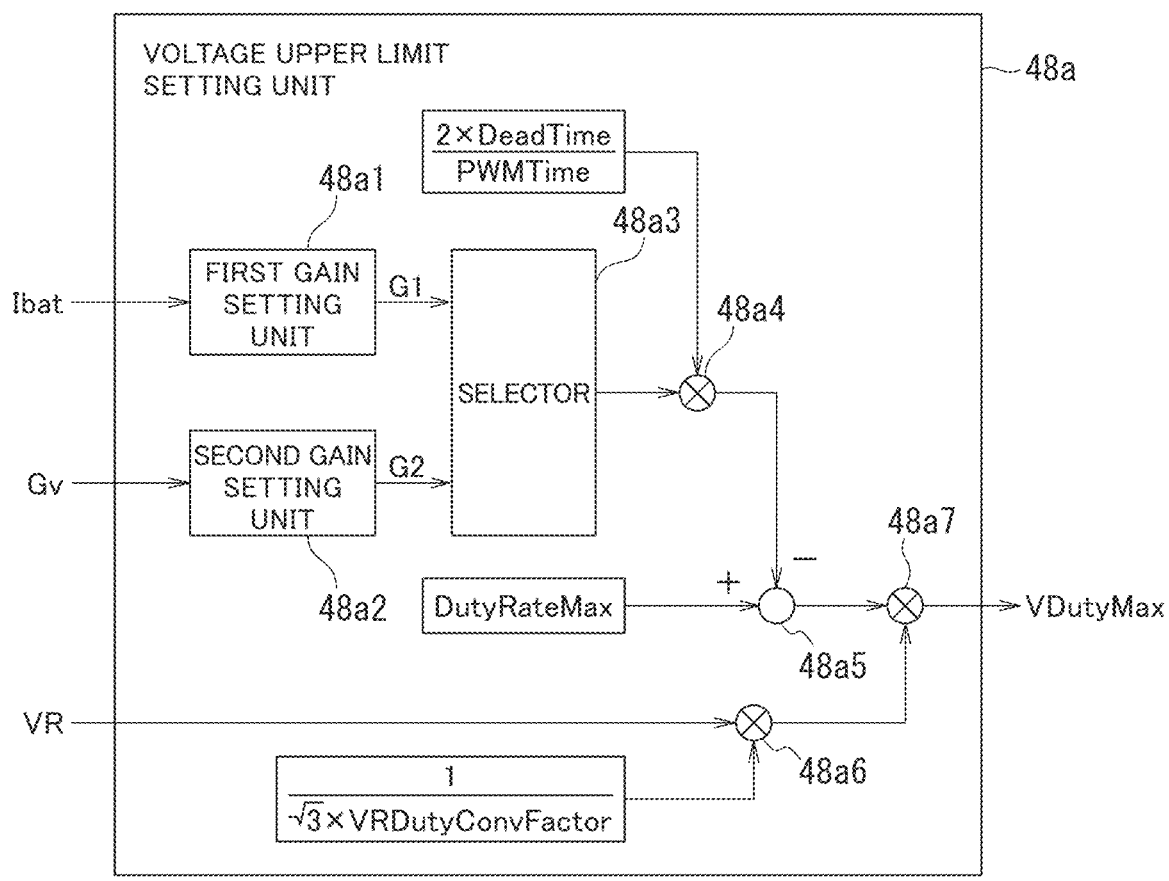
FIG. 7 is a block diagram illustrative of an example of a functional configuration of a voltage upper limit setting unit.

FIG. 7 is a block diagram illustrative of an example of a functional configuration of the voltage upper limit setting unit 48*a*. The voltage upper limit setting unit 48*a* includes a first gain setting unit 48*a*1, a second gain setting unit 48*a*2, a selector 48*a*3, multipliers 48*a*4, 48*a*6, and 48*a*7, and a subtracter 48*a*5.

Figure 8A:
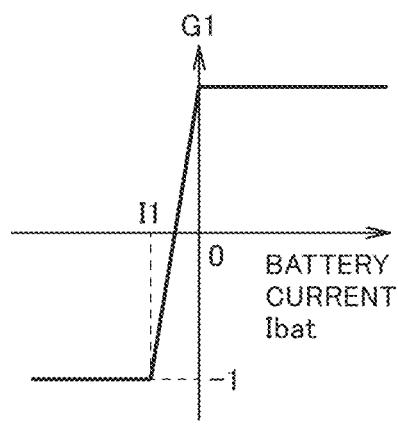
FIGS. 8A and 8B are schematic diagrams of a first example and a second example of a setting example of a first determination gain, respectively.

The first gain setting unit 48*a*1 determines whether the motor 20 is in the power running state or the regeneration state, based on the battery current Ibat and outputs a first determination gain G1 that indicates a determination result. The first determination gain G1 has a value "1" when the motor 20 is in the power running state, and the first determination gain G1 has a value "−1" when the motor 20 is in the regeneration state. FIG. 8A is a schematic diagram of a first example of a setting example of the first determination gain G1. For example, the first determination gain G1 may be set to the value "−1" when the battery current Ibat is less than or equal to a value I1 that is smaller than the value "0", be set to the value "1" when the battery current Ibat is greater than or equal to the value "0", and gradually increase linearly or gradually increase nonlinearly from the value "−1" to the value "1" as the battery current Ibat increases when the battery current Ibat falls within a range from the value I1 to the value "0".

Figure 8B:
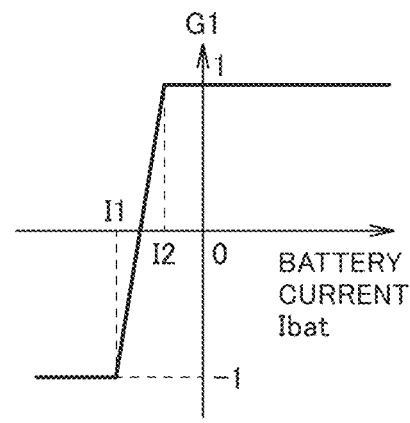

A battery current Ibat at which the first determination gain G1 is set to the value "1" may be set to a value I2 that is smaller than "0" by providing a margin to the battery current Ibat. FIG. 8B is a schematic diagram of a second example of the setting example of the first determination gain G1. The reason why the first determination gain G1 is set in accordance with the second example is that a sign of the first determination gain G1 being erroneously set causes duty saturation to occur.

For example, the value I2 that is greater than the value I1 and less than the value "0" is set, and the first determination gain G1 may be set to the value "1" when the battery current Ibat is greater than or equal to the value I2 and gradually increase linearly or gradually increase nonlinearly from the value "−1" to the value "1" as the battery current Ibat increases when the battery current Ibat falls within a range from the value I1 to the value I2.

FIG. 7 is now referred to. The second gain setting unit 48*a*2 determines whether or not the duty ratio is close to an upper limit, based on the voltage limiting gain Gv, which will be described later, and outputs a second determination gain G2 that indicates a determination result. The second determination gain G2 has the value "1" when the duty ratio is close to the upper limit, and the second determination gain G2 has the value "−1" when the duty ratio is not close to the upper limit.

Figure 8C:
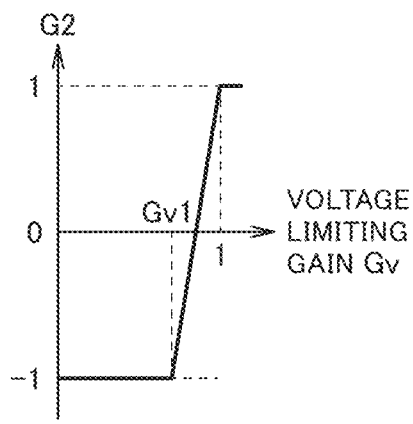
FIGS. 8C and 8D are schematic diagrams of a first example and a second example of a setting example of a second determination gain, respectively.

FIG. 8C is a schematic diagram of a first example of a setting example of the second determination gain G2. For example, the second determination gain G2 may be set to the value "−1" when the voltage limiting gain Gv is less than or equal to a value Gv1 that is smaller than the value "1", be set to the value "1" when the voltage limiting gain Gv is greater than or equal to the value "1", and gradually increase linearly or gradually increase nonlinearly from the value "−1" to the value "1" as the voltage limiting gain Gv increases when the voltage limiting gain Gv falls within a range from the value Gv1 to the value "1".

Figure 8D:
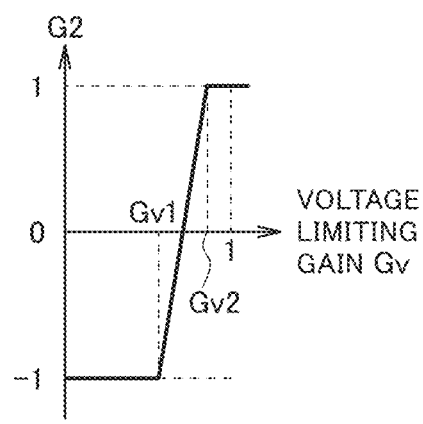

A voltage limiting gain Gv at which the second determination gain G2 is set to the value "1" may be set to a value Gv2 that is smaller than "1" by providing a margin to the voltage limiting gain Gv. FIG. 8D is a schematic diagram of a second example of the setting example of the second determination gain G2. The reason why the second determination gain G2 is set in accordance with the second example is that a sign of the second determination gain G2 being erroneously set causes duty saturation to occur.

For example, the value Gv2 that is greater than the value Gv1 and less than the value "1" is set, and the second determination gain G2 may be set to the value "1" when the voltage limiting gain Gv is greater than or equal to the value Gv2 and gradually increase linearly or gradually increase nonlinearly from the value "−1" to the value "1" as the voltage limiting gain Gv increases when the voltage limiting gain Gv falls within a range from the value Gv1 to the value Gv2.

FIG. 7 is now referred to. The selector 48a3 outputs a larger one of the first determination gain G1 and the second determination gain G2 to the multiplier 48a4. The multipliers 48a4, 48a6, and 48a7 and the subtracter 48a5 calculate the voltage upper limit VDutyMax in accordance with the computation formulae in the above-described equations (8) and (9).

FIG. 6 is now referred to. The disturbance voltage suppression unit 48b is disposed in the succeeding stage of the FB control unit 47 and functions as a voltage disturbance observer that suppresses influence exerted on the FB d-axis voltage command value Vdfb and the FB q-axis voltage command value Vqfb by counter electromotive voltage or other disturbance voltage.

The disturbance voltage suppression unit 48b includes a delay element 48b1, an adder 48b2, a filter 48b3, and a multiplier 48b4. The delay element 48b1 is an example of a "first delay element" and a "second delay element" described in the claims.

The delay element 48b1 delays a d-axis voltage command value (Gv×Vdobs) and a q-axis voltage command value (Gv×Vqobs) that are output from the disturbance voltage suppression unit 48b and subsequently inputs the delayed d-axis voltage command value and q-axis voltage command value to the adder 48b2. That is, the delay element 48b1 inputs past values (last values) of the d-axis voltage command value (Gv×Vdobs) and the q-axis voltage command value (Gv×Vqobs) to the adder 48b2.

The adder 48b2 outputs a sum obtained by adding the FB d-axis voltage command value Vdfb to the past value of the d-axis voltage command value (Gv×Vdobs). In addition, the adder 48b2 outputs a sum obtained by adding the FB q-axis voltage command value Vqfb to the past value of the q-axis voltage command value (Gv×Vqobs).

The filter 48b3 calculates the d-axis voltage command value Vdobs and the q-axis voltage command value Vqobs that are obtained by applying filter processing for noise reduction to the outputs from the adder 48b2, as outputs from the voltage disturbance observer.

Specifically, the filter 48b3 calculates the d-axis voltage command value Vdobs by applying the filter processing to the sum of the past value of the d-axis voltage command value (Gv×Vdobs) and the FB d-axis voltage command value Vdfb. In addition, the filter 48b3 calculates the q-axis voltage command value Vqobs by applying the filter processing to the sum of the past value of the q-axis voltage command value (Gv×Vqobs) and the FB q-axis voltage command value Vqfb. For example, the filter 48b3 may be a low-pass filter.

The voltage limiting gain setting unit 48c sets the voltage limiting gain Gv to limit the voltage command values to values less than or equal to the voltage upper limit VDutyMax, based on the outputs Vdobs and Vqobs from the voltage disturbance observer, the FF d-axis voltage command value Vdff, the FF q-axis voltage command value Vqff, and the voltage upper limit VDutyMax.

Specifically, the voltage limiting gain setting unit 48c calculates the voltage limiting gain Gv, using a ratio of the voltage upper limit VDutyMax to a resultant vector of a sum of the d-axis voltage command values and the q-axis voltage command values (the equation (10) below). The limiter 48d limits an upper limit and a lower limit of the voltage limiting gain Gv to "1" and "0", respectively.

[Math 8]

$$Gv = \frac{VDutyMax}{\sqrt{(Vdobs + Vdff)^2 + (Vqobs + Vqff)^2}} \quad (10)$$

The multiplier 48b4 in the disturbance voltage suppression unit 48b multiplies each of the outputs Vdobs and Vqobs from the voltage disturbance observer by the voltage limiting gain Gv, and inputs the multiplication results (Gv×Vdobs) and (Gv×Vqobs) to the delay element 48b1 and also outputs the multiplication results (Gv×Vdobs) and (Gv×Vqobs) to the adder 48f.

The multiplier 48e multiplies each of the FF d-axis voltage command value Vdff and the FF q-axis voltage command value Vqff by the voltage limiting gain Gv and outputs the multiplication results (Gv×Vdff) and (Gv×Vqff) to the adder 48f.

The adder 48f calculates a sum of the multiplication results (Gv×Vdobs) and (Gv×Vdff) as the second d-axis voltage command value Vd=Gv×(Vdobs+Vdff) and calculates a sum of the multiplication results (Gv×Vqobs) and (Gv×Vqff) as the second q-axis voltage command value Vq=Gv×(Vqobs+Vqff).

As described above, multiplying the voltage command values by the voltage limiting gain Gv and thereby limiting the voltage command values enable the duty ratio to be prevented from being saturated at 100% in the PWM control based on the second d-axis voltage command value Vd and the second q-axis voltage command value Vq.

FIG. 2 is now referred to. The two-phase/three-phase conversion unit 49 converts the second d-axis voltage command value Vd and the second q-axis voltage command value Vq to three-phase voltage command values.

The three-phase voltage command values are input to the PWM control unit 50, and further, the motor 20 is PWM-driven by the inverter 51. Driving currents of the motor 20 are detected by the motor current detector 21, converted to the d-axis current id and the q-axis current iq by the three-phase/two-phase conversion unit 46, and fed back to the subtracter 47a in the FB control unit 47.

(Action)

The d-axis current command value calculation unit 41 calculates the base d-axis current command value Idr0, based on the above-described equation (4). Since nominal values are set as the constants R and L in the equation, error due to variation in physical parameters, temperature change, or the like occurs. In addition, error also occurs in a detected value of the rotational velocity ω of the motor 20 due to delay, noise, or the like. Thus, it is difficult to completely prevent duty saturation by limiting the d-axis current command value.

Therefore, in the present embodiment, prevention of duty saturation is performed in the voltage limiting unit 48 in a later stage, and calculation of an optimum d-axis current command value is attempted in the d-axis current command value calculation unit 41.

Although in the present embodiment, duty saturation is not taken into consideration in the d-axis current command value calculation unit 41 as described above, when a d-axis current command value calculated in accordance with the above-described equation (4) is used without change, there is a risk that the d-axis current command value is calculated as an excessive value. Thus, what influence each input parameter exerts on the d-axis current command value is examined based on the above-described equation (4). It is revealed from the above-described equation (4) that to cause the d-axis current command value to increase in the negative direction (to intensify the field-weakening control), it is only necessary that the rotational velocity ω of the motor increases, the power source voltage VR is reduced, or the q-axis current command value Iqt increases.

Next, influence when the q-axis current command value Iqt that is used when the base d-axis current command value Idr0 is to be calculated and the second q-axis current command value Iqr2 that is actually used for calculation of a voltage command value deviate from each other is examined.

When the second q-axis current command value Iqr2 deviates in a direction in which the second q-axis current command value Iqr2 increases, duty saturation occurs since the d-axis current command value becomes insufficient. As a cause of this phenomenon, a case where the output Δq from the angular acceleration regulator 42 is added to the base q-axis current command value Iqr0 is conceivable. However, it is conjectured that while the output Δq from the angular acceleration regulator steeply changes, the d-axis current command value cannot follow such a rapid change since the d-axis current command value is limited by the rate limiter and the like. Thus, a period during which the second q-axis current command value Iqr2 deviates in the direction in which the second q-axis current command value Iqr2 increases is short and influence of the deviation is limited. Therefore, a case where the second q-axis current command value Iqr2 deviates in the direction in which the second q-axis current command value Iqr2 increases is not taken into consideration.

When the second q-axis current command value Iqr2 deviates in a direction in which the second q-axis current command value Iqr2 decreases, the base d-axis current command value Idr0 becomes excessive and it becomes impossible to use the duty ratio to an upper limit. As a cause of this phenomenon, a case where the q-axis current command value is limited in a later stage is conceivable. The limitation of the q-axis current command value in a later stage is the system current limitation using the limiting gain Gq3 expressed by the above-described equation (5) and the battery current limitation using the limiting gain Gq4 expressed by the above-described equation (7).

Therefore, by calculating a q-axis current command value Iqt to which the above-described limitations are applied by the above-described equations (1) and (3) in the current command value setting unit 41a and using the calculated q-axis current command value Iqt in the calculation of the base d-axis current command value Idr0, an optimum q-axis current command value is calculated.

In addition, the voltage limiting unit 48 calculates the voltage limiting gain Gv to perform voltage limitation and multiplies a voltage command value by the calculated voltage limiting gain Gv. Since when a voltage command value is multiplied by the voltage limiting gain Gv in the disturbance voltage suppression unit 48b, which functions as the voltage disturbance observer, an upper limit of the integrator that constitutes the voltage disturbance observer can be limited, the voltage limiting gain Gv essentially functions as the anti-windup function.

Note that in the voltage limiting unit 48, the d-axis voltage command value and the q-axis voltage command value are limited by multiplying the d-axis voltage command value and the q-axis voltage command value by gains having the same value (the voltage limiting gain Gv). This is because since the voltage disturbance observer includes an integrator, there is a risk that when the q-axis is limited in a preferential manner, the d-axis voltage command value continues to increase to an upper limit even though the resultant vector of the sum of the d-axis voltage command value and the q-axis voltage command value is limited at an upper limit, the q-axis voltage command value is rapidly limited in accordance with the increase in the d-axis voltage command value, and the rapid limitation leads to a sudden change in the output.

In addition, regarding the setting of the voltage upper limit VDutyMax by the voltage upper limit setting unit 48a, the dead time acts in such a manner as to decrease the duty at the time of power running and to increase the duty at the time of regeneration.

The above-described equation (8) is a calculation formula of the voltage upper limit VDutyMax at the time of power running, and when switching of a direction in which the dead time acts at the time of regeneration is not taken into consideration, there is a risk that deviation occurs in the upper limit of the duty ratio. Thus, in the present embodiment, whether the motor 20 is performing the power running or the regeneration is determined, and a sign of a voltage command value equivalent to a reduction due to the dead time is switched.

However, since simply switching the sign causes the duty ratio to suddenly change, there is a risk that overcurrent or operation noise occurs. Thus, the battery current Ibat is used as a determination condition of the regeneration and the voltage limiting gain Gv is also used as a determination condition of the duty, and the determination gains G1 and G2 are calculated based on the battery current Ibat and the voltage limiting gain Gv. However, since it is difficult to determine which one of the determination conditions is satisfied, fade switching between the two determination gains G1 and G2 is achieved by switching the sign, based on the maximum value between the determination gains G1 and G2.

In addition, the FB control unit 47 includes the anti-windup function of integrated values in the integrator 47e. In general, the anti-windup function is aimed at preventing integrated values from being excessively accumulated when output from a controller including an integrator is limited due to some reason.

In a general configuration of the anti-windup function, by performing some processing on a difference value between outputs before and after limitation and feeding back the processed value, an upper limit of an integrated value is limited.

In the present embodiment, the output from the FB control unit 47 hardly exceeds a voltage upper limit, and on most occasions, the output from the disturbance voltage suppression unit (voltage disturbance observer) 48b disposed in the succeeding stage exceeds the voltage upper limit. Therefore, the general configuration of the anti-windup cannot be used without change.

In addition, even in a state in which a voltage command value is limited by a voltage upper limit, a ratio of the output from the FB control unit 47 to the output from the disturbance voltage suppression unit 48b can preferably be changed (for example, since in a situation in which the rotational velocity ω of the motor 20 decreases and torque increases, the counter electromotive voltage decreases and the q-axis current increases, it is preferable that a ratio of the output from the FB control unit 47 increase and a ratio of the output from the disturbance voltage suppression unit 48b decrease).

Thus, in the present embodiment, an integrated value of the integrator 47e in the FB control unit 47 and the outputs Vdobs and Vqobs from the voltage disturbance observer in the disturbance voltage suppression unit 48b are multiplied by gains having the same value (the voltage limiting gain Gv) and limited, and a load is equally divided between the FB control unit 47 and the disturbance voltage suppression unit 48b.

(Operation)

Figure 9:
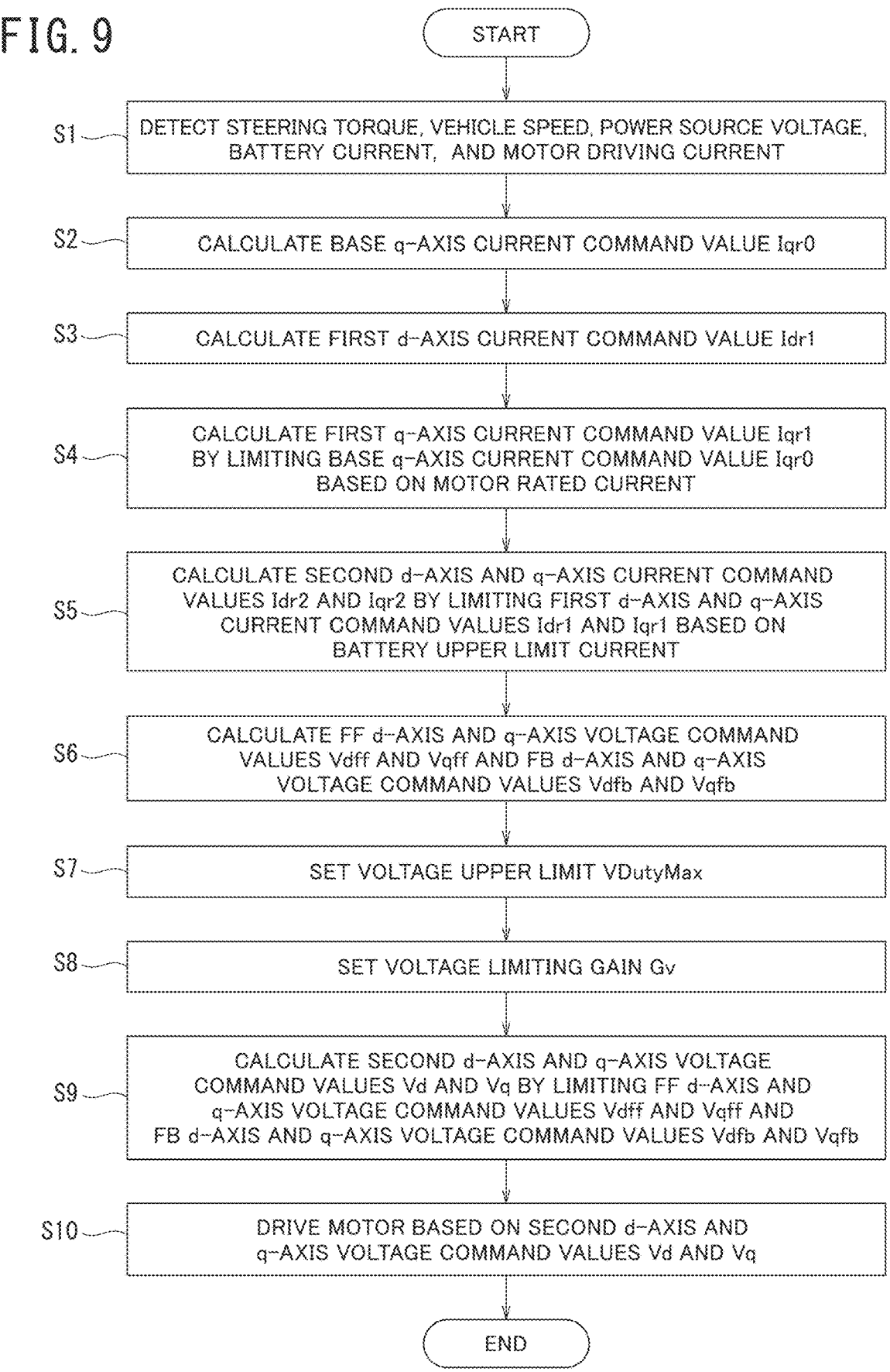
FIG. 9 is a flowchart of an example of a motor control method of the embodiment.

FIG. 9 is a flowchart of an example of a motor control method of the embodiment.

In step S1, the torque sensor 10, the vehicle speed sensor 12, and the motor current detector 21 detect the steering torque Th, the vehicle speed Vh, and the driving current of the motor 20, respectively. In addition, a voltage sensor and a current sensor detect the power source voltage VR and the battery current Ibat supplied by the battery 13, respectively.

In step S2, the torque control unit 40 calculates the base q-axis current command value Iqr0, based on at least the steering torque Th and the vehicle speed Vh.

In step S3, the d-axis current command value calculation unit 41 sets the first d-axis current command value Idr1, based on the base q-axis current command value Iqr0, the power source voltage VR, and the rotational velocity ω of the motor 20.

In step S4, the first current limiting unit 43 calculates the first q-axis current command value Iqr1 by limiting the base q-axis current command value Iqr0, based on the rated current of the motor 20.

In step S5, the second current limiting unit 44 calculates the second d-axis current command value Idr2 and the second q-axis current command value Iqr2 by limiting the first d-axis current command value Idr1 and the first q-axis current command value Iqr1, based on battery upper limit current Ibatmax, respectively.

In step S6, the FF control unit 45 calculates the FF d-axis voltage command value Vdff and the FF q-axis voltage command value Vqff. The FB control unit 47 calculates the FB d-axis voltage command value Vdfb and the FB q-axis voltage command value Vqfb.

In step S7, the voltage upper limit setting unit 48a sets the voltage upper limit VDutyMax.

In step S8, the voltage limiting gain setting unit 48c sets the voltage limiting gain Gv, based on the voltage upper limit VDutyMax.

In step S9, the voltage limiting unit 48 calculates the second d-axis voltage command value Vd and the second q-axis voltage command value Vq by limiting the FF d-axis voltage command value Vdff, the FF q-axis voltage command value Vqff, the FB d-axis voltage command value Vdfb, and the FB q-axis voltage command value Vqfb, using the voltage limiting gain Gv.

In step S10, the PWM control unit 50 and the inverter 51 drive the motor 20, based on the second d-axis voltage command value Vd and the second q-axis voltage command value Vq. Subsequently, the process terminates.

(Variations)

The motor control device according to the present invention is not limited to the above-described embodiment, and various modification can be made without departing from the spirit and scope of the present invention.

For example, although in the above-described embodiment, as an application example of the motor control device according to the present invention, the electric power steering device including the motor control device was described as an example, a scope of application of the motor control device according to the present invention is not limited to the electric power steering device and is applicable to various types of mechanical devices using a motor control device.

Figure 10:
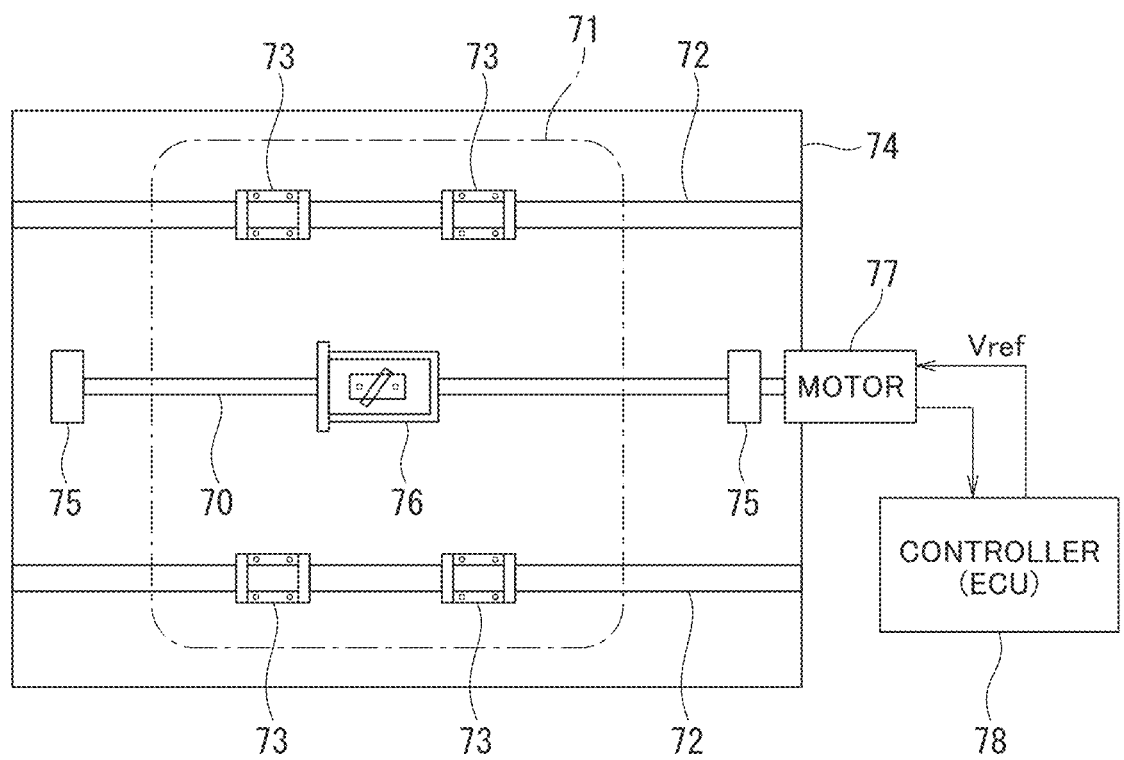
FIG. 10 is a configuration diagram illustrative of an outline of an example of a linear motion table device in which the motor control device of the present invention is used.

FIG. 10 is a configuration diagram illustrative of an outline of an example of a linear motion table device in which the motor control device of the present invention is used.

The linear motion table device includes a feed screw device, a table 71, two linear guides (linear motion guide devices), and a base 74.

The feed screw device includes a screw shaft 70, a nut 76, and a motor 77, and the screw shaft 70 is inserted into the nut 76. A feed screw mechanism in the feed screw device is a ball screw in which a spiral groove of the screw shaft 70 and a spiral groove of the nut 76 come into point contact with each other via balls (rolling elements). The motor 77 is coupled to one end in the axial direction of the screw shaft 70.

Each of the two linear guides includes a guide rail 72, two sliders (mobile units) 73, and a plurality of rolling elements. In each linear guide, the guide rail 72 and each of the sliders 73 have raceway surfaces that form rolling paths for the rolling elements at positions facing each other. Both raceway surfaces extend in the longitudinal direction of the guide rail 72, and the sliders 73 linearly move along the guide rail 72 via the rolling elements rolling in the rolling paths while being loaded.

The linear guides are arranged at both ends in a direction perpendicular to a movement direction Y of the table 71 on the base 74, and the feed screw device is arranged between the two linear guides. The guide rails 72 and the screw shaft 70 are arranged in parallel with the movement direction Y of the table 71.

In the arrangement, the guide rails 72 are fixed to the base 74. Rolling bearings are attached at both ends in the axial direction of the screw shaft 70, a housing 75 is fixed to an outer ring of each of the rolling bearings, and each of the housing 75 is fixed to the base 74. Because of this configuration, the screw shaft 70 is rotatably supported with respect to the base 74.

The table 71 is arranged above the two sliders 73 of each of the linear guides and the nut 76 of the feed screw device, and is directly fixed to the sliders 73 and is fixed to the nut 76 via a bracket. That is, the two sliders 73 of each of the linear guides and the nut 76 of the feed screw device are fixed to one surface of the table 71.

In the linear motion table, when the motor 77 is driven and the feed screw device is operated, the screw shaft 70 rotates and the nut 76 linearly moves by the ball screw mechanism. In association with this movement, the table 71 linearly moves while being guided by the linear guides.

A controller 78 sets current command values to drive the motor 77 and, by performing the same processing as the processing performed by the controller 30 of the above-described embodiment, calculates voltage control command values Vref from the current command values and controls currents to be supplied to the motor 20.

Advantageous Effects of Embodiment (1) A motor control device includes: a torque control unit configured to set a base q-axis current command value to control torque generated by a motor; a d-axis current command value calculation unit configured to set a first d-axis current command value for field-weakening, based on the base q-axis current command value and rotational velocity of the motor; a first current limiting unit disposed in a succeeding stage of the d-axis current command value calculation unit and configured to calculate a first q-axis current command value by limiting the base q-axis current command value according to the first d-axis current command value in such a way that driving current of the motor does not exceed a rated current of the motor; a second current limiting unit disposed in a succeeding stage of the first current limiting unit and configured to calculate a second d-axis current command value and a second q-axis current command value by limiting the first d-axis current command value and the first q-axis current command value, respectively in such a way that output current from a battery does not exceed a predetermined allowable upper limit; a voltage command value calculation unit configured to calculate a first d-axis voltage command value and a first q-axis voltage command value, based on the second d-axis current command value and the second q-axis current command value; a voltage limiting unit configured to calculate a second d-axis voltage command value and a second q-axis voltage command value by limiting the first d-axis voltage command value and the first q-axis voltage command value, respectively in such a way as to prevent saturation of a duty ratio in PWM control based on the first d-axis voltage command value and the first q-axis voltage command value; and a drive circuit configured to drive the motor, based on the second d-axis voltage command value and the second q-axis voltage command value.

Because of this configuration, the motor control device of the embodiment is capable of preventing the saturation of the duty ratio in a high load condition and reduction in the duty ratio in a high rotational velocity region.

(2) The d-axis current command value calculation unit may calculate the first d-axis current command value according to a q-axis current command value obtained by limiting the base q-axis current command value in such a way that driving current of the motor does not exceed a rated current of the motor, based on a past value of the second d-axis current command value.

Because of this configuration, even when the q-axis current command value that is used for calculation of a voltage command value is limited based on the rated current of the motor, deviation of the q-axis current command value that is used for calculation of the first d-axis current command value from the q-axis command value that is used for calculation of a voltage command value can be reduced. As a result, it is possible to prevent an excessive first d-axis current command value from being calculated and the duty ratio from being limited to a value lower than an upper limit.

(3) The d-axis current command value calculation unit may calculate the first d-axis current command value according to a q-axis current command value obtained by limiting the base q-axis current command value in such a way that output current from the battery does not exceed the allowable upper limit, based on a past value of the second d-axis current command value.

Because of this configuration, even when the q-axis current command value that is used for calculation of a voltage command value is limited based on the upper limit current of the battery, deviation of the q-axis current command value that is used for calculation of the first d-axis current command value from the q-axis command value that is used for calculation of a voltage command value can be reduced. As a result, it is possible to prevent an excessive first d-axis current command value from being calculated and the duty ratio from being limited to a value lower than an upper limit.

(4) The d-axis current command value calculation unit may limit an upper limit of the first d-axis current command value, based on rotational velocity of the motor.

Because of this configuration, operation noise and a counter measure against overcurrent can be balanced.

(5) The voltage limiting unit may include a voltage upper limit setting unit configured to set a voltage upper limit, the voltage upper limit being an upper limit of applied voltage to the motor, and a voltage limiting gain setting unit configured to set a voltage limiting gain according to the voltage upper limit and calculate a second d-axis voltage command value and a second q-axis voltage command value by limiting the first d-axis voltage command value and the first q-axis voltage command value, respectively according to the voltage limiting gain.

Because of this configuration, the motor control device is capable of preventing saturation of the duty ratio in a high load condition.

(6) The voltage upper limit setting unit may set a voltage upper limit, based on at least one of a voltage equivalent to use efficiency improvement achieved by superimposing a third-order harmonic on polyphase voltage command values of the motor, the motor being a polyphase motor, a voltage drop due to dead time, and a reduction in a ratio of motor terminal voltage to a duty ratio due to dead time compensation.

Because of this configuration, the voltage upper limit to limit the voltage command value can be appropriately set.

(7) The voltage limiting unit may include a disturbance voltage suppression unit configured to output a first multiplication result obtained by multiplying a sum of the first d-axis voltage command value and output from a first delay element by the voltage limiting gain and a second multiplication result obtained by multiplying a sum of the first q-axis voltage command value and output from a second delay element by the voltage limiting gain and also input the first multiplication result and the second multiplication result to the first delay element and the second delay element, respectively and output the second d-axis voltage command value including the first multiplication result and the second q-axis voltage command value including the second multiplication result.

Because of this configuration, the voltage command value can be limited based on the voltage limiting gain. In addition, influence that the disturbance voltage exerts on the first d-axis voltage command value and the first q-axis voltage command value can be prevented.

(8) The voltage limiting gain setting unit may set the voltage limiting gain, based on the voltage upper limit, the sum of the first d-axis voltage command value and output from the first delay element and the sum of the first q-axis voltage command value and output from the second delay element.

Because of this configuration, the voltage limiting gain can be calculated using a ratio of the voltage upper limit to a resultant vector of a sum of the d-axis voltage command value and the q-axis voltage command value.

(9) The voltage command value calculation unit may output the first d-axis voltage command value and the first q-axis voltage command value including a d-axis integral component, the d-axis integral component being an integral component of deviation of a detected value of d-axis current in driving current of the motor from the second d-axis current command value, and a q-axis integral component, the q-axis integral component being an integral component of deviation of a detected value of q-axis current in driving current of the motor from the second q-axis current command value, respectively and suppress the d-axis integral component and the q-axis integral component, based on the voltage limiting gain.

Because of this configuration, in the voltage command value calculation unit configured to calculate a voltage command value through integral control, an anti-windup function of integrated values can be achieved.

(10) The first d-axis voltage command value may include a feedforward d-axis voltage command value calculated by feedforward control based on the second d-axis current command value and a feedback d-axis voltage command value calculated by feedback control based on deviation of a detected value of d-axis current in driving current of the motor from the second d-axis current command value. In addition, the first q-axis voltage command value may include a feedforward q-axis voltage command value calculated by feedforward control based on the second q-axis current command value and a feedback q-axis voltage command value calculated by feedback control based on deviation of a detected value of the q-axis current in driving current of the motor from the second q-axis current command value.

The disturbance voltage suppression unit may output the first multiplication result obtained by multiplying a sum of the feedback d-axis voltage command value and output from the first delay element by the voltage limiting gain and the second multiplication result obtained by multiplying a sum of the feedback q-axis voltage command value and output from the second delay element by the voltage limiting gain and also input the first multiplication result and the second multiplication result to the first delay element and the second delay element, respectively.

The voltage limiting gain setting unit may set the voltage limiting gain, based on the voltage upper limit, a sum of the feedback d-axis voltage command value, output from the first delay element, and the feedforward d-axis voltage command value and a sum of the feedback q-axis voltage command value, output from the second delay element, and the feedforward q-axis voltage command value.

The voltage limiting unit may output the second d-axis voltage command value including a third multiplication result obtained by multiplying the feedforward d-axis voltage command value by the voltage limiting gain and the first multiplication result and also output the second q-axis voltage command value including a fourth multiplication result obtained by multiplying the feedforward q-axis voltage command value by the voltage limiting gain and the second multiplication result.

Because of this configuration, improvement in responsiveness by the feedforward control and prevention of influence of disturbance by the feedback control can be achieved. In addition, the voltage command value can be limited based on the voltage limiting gain. Further, influence that the disturbance voltage exerts on the feedback d-axis voltage command value and the feedback q-axis voltage command value can be prevented.

Furthermore, the voltage limiting gain can be calculated using a ratio of the voltage upper limit to a resultant vector of the sum of the d-axis voltage command value and the q-axis voltage command value.

REFERENCE SIGNS LIST

1 Steering wheel
2 Steering shaft
3 Reduction gear
4a, 4b Universal joint
5 Pinion rack mechanism
5a Pinion
5b Rack
6a, 6b Tie rod
7a, 7b Hub unit
8L, 8R Steered wheel
10 Torque sensor
11 Ignition key
12 Vehicle speed sensor
13 Battery
14 Steering angle sensor
20, 77 Motor
21 Motor current detector
30 Controller
40 Torque control unit
41 d-axis current command value calculation unit
41a Current command value setting unit
41b Field current command value calculation unit
41c Field current limiting unit
42 Angular acceleration regulator
43 First current limiting unit
44 Second current limiting unit
45 Feedforward control unit
46 Three-phase/two-phase conversion unit
47 Feedback control unit
47a, 48a5 Subtracter
47b, 47d, 47e3, 47f Gain multiplication unit
47c Approximate differentiating unit
47e Integrator
47e1, 48b1 Delay element
47e2, 47g, 48b2, 48f Adder
48 Voltage limiting unit
48a Voltage upper limit setting unit
48a1 First gain setting unit
48a2 Second gain setting unit
48a3 Selector
48a4, 48a6, 48a7, 48b4, 48e Multiplier
48b Disturbance voltage suppression unit
48b3 Filter
48c Voltage limiting gain setting unit
48d Limiter
49 Two-phase/three-phase conversion unit
50 PWM control unit
51 Inverter
70 Screw shaft
71 Table
72 Guide rail
73 Slider
74 Base
75 Housing
76 Nut

The invention claimed is:

1. A motor control device comprising:
a torque control unit configured to set a base q-axis current command value to control torque generated by a motor;
a d-axis current command value calculation unit configured to set a first d-axis current command value for field-weakening, based on the base q-axis current command value and rotational velocity of the motor;
a first current limiting unit disposed in a succeeding stage of the d-axis current command value calculation unit and configured to calculate a first q-axis current command value by limiting the base q-axis current command value according to the first d-axis current command value in such a way that driving current of the motor does not exceed a rated current of the motor;
a second current limiting unit disposed in a succeeding stage of the first current limiting unit and configured to calculate a second d-axis current command value and a second q-axis current command value by limiting the first d-axis current command value and the first q-axis current command value, respectively in such a way that output current from a battery does not exceed a predetermined allowable upper limit;
a voltage command value calculation unit configured to calculate a first d-axis voltage command value and a first q-axis voltage command value, based on the second d-axis current command value and the second q-axis current command value;
a voltage limiting unit configured to calculate a second d-axis voltage command value and a second q-axis voltage command value by limiting the first d-axis voltage command value and the first q-axis voltage command value, respectively in such a way as to prevent saturation of a duty ratio in PWM control based on the first d-axis voltage command value and the first q-axis voltage command value; and
a drive circuit configured to drive the motor, based on the second d-axis voltage command value and the second q-axis voltage command value.

2. The motor control device according to claim 1, wherein the d-axis current command value calculation unit calculates the first d-axis current command value according to a q-axis current command value obtained by limiting the base q-axis current command value in such a way that driving current of the motor does not exceed a rated current of the motor, based on a past value of the second d-axis current command value.

3. The motor control device according to claim 1, wherein the d-axis current command value calculation unit calculates the first d-axis current command value according to a q-axis current command value obtained by limiting the base q-axis current command value in such a way that output current from the battery does not exceed the allowable upper limit, based on a past value of the second d-axis current command value.

4. The motor control device according to claim 1, wherein the d-axis current command value calculation unit limits an upper limit of the first d-axis current command value, based on rotational velocity of the motor.

5. The motor control device according to claim 1, wherein the voltage limiting unit includes:
a voltage upper limit setting unit configured to set a voltage upper limit, the voltage upper limit being an upper limit of applied voltage to the motor; and
a voltage limiting gain setting unit configured to set a voltage limiting gain according to the voltage upper limit, and
calculates a second d-axis voltage command value and a second q-axis voltage command value by limiting the first d-axis voltage command value and the first q-axis voltage command value, respectively according to the voltage limiting gain.

6. The motor control device according to claim 5, wherein the voltage upper limit setting unit sets a voltage upper limit, based on at least one of a voltage equivalent to use efficiency improvement achieved by superimposing a third-order harmonic on polyphase voltage command values of the motor, the motor being a polyphase motor, a voltage drop due to dead time, and a reduction in a ratio of motor terminal voltage to a duty ratio due to dead time compensation.

7. The motor control device according to claim 5, wherein the voltage limiting unit:
includes a disturbance voltage suppression unit configured to output a first multiplication result obtained by multiplying a sum of the first d-axis voltage command value and output from a first delay element by the voltage limiting gain and a second multiplication result obtained by multiplying a sum of the first q-axis voltage command value and output from a second delay element by the voltage limiting gain and also input the first multiplication result and the second multiplication result to the first delay element and the second delay element, respectively; and
outputs the second d-axis voltage command value including the first multiplication result and the second q-axis voltage command value including the second multiplication result.

8. The motor control device according to claim 7, wherein the voltage limiting gain setting unit sets the voltage limiting gain, based on the voltage upper limit, the sum of the first d-axis voltage command value and output from the first delay element and the sum of the first q-axis voltage command value and output from the second delay element.

9. The motor control device according to claim 7, wherein the voltage command value calculation unit outputs the first d-axis voltage command value and the first q-axis voltage command value including a d-axis integral component, the d-axis integral component being an integral component of deviation of a detected value of d-axis current in driving current of the motor from the second d-axis current command value, and a q-axis integral component, the q-axis integral component being an integral component of deviation of a detected value of q-axis current in driving current of the motor from the second q-axis current command value, respectively and suppresses the d-axis integral component and the q-axis integral component, based on the voltage limiting gain.

10. The motor control device according to claim 7, wherein
the first d-axis voltage command value includes a feedforward d-axis voltage command value calculated by feedforward control based on the second d-axis current command value and a feedback d-axis voltage command value calculated by feedback control based on deviation of a detected value of d-axis current in driving current of the motor from the second d-axis current command value,
the first q-axis voltage command value includes a feedforward q-axis voltage command value calculated by feedforward control based on the second q-axis current command value and a feedback q-axis voltage command value calculated by feedback control based on deviation of a detected value of q-axis current in driving current of the motor from the second q-axis current command value,
the disturbance voltage suppression unit:
outputs the first multiplication result obtained by multiplying a sum of the feedback d-axis voltage command value and output from the first delay element by the voltage limiting gain and the second multiplication result obtained by multiplying a sum of the feedback q-axis voltage command value and output from the second delay element by the voltage limiting gain; and
inputs the first multiplication result and the second multiplication result to the first delay element and the second delay element, respectively,
the voltage limiting gain setting unit sets the voltage limiting gain, based on the voltage upper limit, a sum of the feedback d-axis voltage command value, output from the first delay element, and the feedforward d-axis voltage command value, and a sum of the feedback q-axis voltage command value, output from the second delay element, and the feedforward q-axis voltage command value, and the voltage limiting unit outputs the second d-axis voltage command value including a third multiplication result obtained by multiplying the feedforward d-axis voltage command value by the voltage limiting gain and the first multiplication result and also outputs the second q-axis voltage command value including a fourth multiplication result obtained by multiplying the feedforward q-axis voltage command value by the voltage limiting gain and the second multiplication result.

11. An electric power steering device comprising:

the motor control device according to claim 1; and wherein the electric power steering device provides a steering system of a vehicle with a steering assist force, using the motor.

* * * * *